United States Patent
Braam et al.

(10) Patent No.: US 7,054,351 B1
(45) Date of Patent: May 30, 2006

(54) METHOD FOR MEMORY ACCESS CONTROL IN RAKE RECEIVERS WITH EARLY LATE TRACKING IN TELECOMMUNICATION SYSTEMS

(75) Inventors: Reinhold Braam, Rhede (DE); Ulf Niemeyer, Bochum (DE); Oskar Skuk, Wien (AT); Andreas Falkenberg, Hagen (DE); Christoph Rohe, Bochum (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/830,624

(22) PCT Filed: Oct. 27, 1999

(86) PCT No.: PCT/DE99/03430

§ 371 (c)(1),
(2), (4) Date: Dec. 3, 2001

(87) PCT Pub. No.: WO00/25435

PCT Pub. Date: May 4, 2000

(30) Foreign Application Priority Data

Oct. 27, 1998 (DE) ................................. 198 49 532

(51) Int. Cl.
*H04B 1/69* (2006.01)

(52) U.S. Cl. ..................................................... 375/144

(58) Field of Classification Search ................ 375/130, 375/136, 142, 143, 147, 150, 152, 134, 137, 375/145, 149, 346, 348, 140, 144; 370/320, 370/335, 342, 441
See application file for complete search history.

(56) References Cited

U.S. PATENT DOCUMENTS

| | | | |
|---|---|---|---|
| 5,659,573 A | | 8/1997 | Bruckert et al. |
| 5,764,687 A | * | 6/1998 | Easton ........................ 375/147 |
| 5,799,010 A | | 8/1998 | Lomp et al. |
| 6,078,611 A | * | 6/2000 | La Rosa et al. ............ 375/147 |
| 6,141,372 A | * | 10/2000 | Chalmers ..................... 375/147 |
| 6,163,563 A | * | 12/2000 | Baker et al. ................. 375/130 |
| 6,269,075 B1 | * | 7/2001 | Tran ............................ 370/206 |
| 6,332,008 B1 | * | 12/2001 | Giallorenzi et al. ......... 375/356 |
| 6,639,906 B1 | * | 10/2003 | Levin .......................... 370/342 |
| 6,839,378 B1 | * | 1/2005 | Sourour et al. .............. 375/142 |

FOREIGN PATENT DOCUMENTS

| | | |
|---|---|---|
| GB | 2 300 545 | 11/1996 |
| WO | WO 96/10879 | 4/1996 |
| WO | WO 97/28608 | 8/1997 |

OTHER PUBLICATIONS

Digital Communications—John G. Proakis.
Chip Timing Synchronization in an All Digital Band-Limited DS/SS Modem, Gaudenzi et al, pp. 1688-1692.

* cited by examiner

*Primary Examiner*—Emmanuel Bayard
(74) *Attorney, Agent, or Firm*—Bell, Boyd & Lloyd LLC

(57) ABSTRACT

In order to control memory accesses in RAKE receivers having early-late tracking in telecommunications systems with wire-free telecommunication between mobile and/or stationary transmitters/receivers, in particular in third-generation mobile radio systems, such that the number of memory accesses is less than with previous known methods, data which is received in the RAKE receiver and is read by an early finger in the early-late tracking is buffer-stored and is passed on one read cycle later to a late finger for reading by the same in the early-late tracking.

1 Claim, 7 Drawing Sheets

METHOD FOR MEMORY ACCESS CONTROL IN RAKE RECEIVERS WITH EARLY LATE TRACKING IN TELECOMMUNICATION SYSTEMS This application is a 371 of PCT/DE99/03430 filed on Oct. 27, 1999.

BACKGROUND OF THE INVENTION

1. Field of the Invention

The present invention relates, generally, to a method for memory access control in RAKE receivers with early-late tracking in telecommunication systems with wire-free telecommunication between mobile and/or stationary transceivers, and, more particularly, to such a method wherein the number of memory accesses is less than with previously known methods.

2. Description of the Prior Art

Telecommunications systems with wire-free telecommunication between mobile and/or stationary transmitters/receivers are specific message systems with a message transmission path between a message source and a message sink, in which, for example, base stations and mobile parts are used as transmitters and receivers for message processing and transmission, and in which:

1) the message processing and message transmission can take place in one preferred transmission direction (simplex operation) or in both transmission directions (duplex operation);
2) the message processing is preferably digital; and
3) the messages are transmitted via the long-distance transmission path without wires based on various message transmission methods FDMA (Frequency Division Multiple Access), TDMA (Time Division Multiple Access) and/or CDMA (Code Division Multiple Access)—for example in accordance with radio standards such as DECT [Digital Enhanced (previously: European) Cordless Telecommunication; see *Nachrichtentechnik Elektronik* [Information Technology Electronics] 42 (1992) Jan./Feb. No. 1, Berlin, D E; U. Pilger "*Struktur des DECT-Standards*" [Structure of the DECT Standard], pages 23 to 29 in conjunction with ETSI Publication *ETS* 300175-1 . . . 9, October 1992 and the DECT Publication from the *DECT Forum*, February 1997, pages 1 to 16], GSM [Groupe Spéciale Mobile or Global System for Mobile Communication; see *Informatik Spectrum [Information Technology Spectrum]* 14(1991) June No. 3, Berlin, D E; A. Mann: "*Der GSM-Standard—Grundlage für digitale europäische Mobilfunknetze*" [The GSM Standard—Basis of digital European mobile networks], pages 137 to 152 in conjunction with the publication *telekom praxis* 4/1993, P. Smolka "*GSM-Funkschnittstelle—Elemente und Funktionen*" [Telecommunications in practice] [GSM radio interface—Elements and functions] Pages 17 to 24] UMTS [Universal Mobile Telecommunication System; see (1): *Nachrichtentechnik Elektronik [Information Technology Electronics]*, Berlin 45, 1995, issue 1, pages 10 to 14 and issue 2, pages 24 to 27, P. Jung, B. Steiner: "*Konzept eines CDMA-Mobilfunksystems mit gemeinsamer Detektion für die dritte Mobilfunkgeneration*" [Concept of a CDMA mobile radio system with joint detection for third-generation mobile radios]; (2): *Nachrichtentechnik Elektronik [Information Technology Electronics]*, Berlin 41, 1991, issue 6, pages 223 to 227 and page 234; P. W. Baier, P. Jung, A. Klein: "*CDMA—ein günstiges Vielfachzugriffsverfahren für frequenzselektive und zeitvariante Mobilfunkkändle*" [CDMA—a suitable multiple access method for frequency-selective and time-variant mobile radio channels]; (3): *IEICE Transactions on Fundamentals of Electronics, Communications and Computer Sciences*, Vol. E79-A, No. 12, December 1996, pages 1930 to 1937; P. W. Baier, P. Jung: "*CDMA Myths and Realities Revisited*"; (4): *IEEE Personal Communications*, February 1995, pages 38 to 47; A. Urie, M. Streeton, C. Mourot. "*An Advanced TDMA Mobile Access System for UMTS*"; (5): *telekom praxis [Telecommunications practice]*, 5/1995, pages 9 to 14; P. W. Baier: "*Spread-Spectrum-Technik und CDMA—eine ursprünglich militärische Technik erobert den zivilen Bereich*" [Spread spectrum technology and CDMA—an originally military technology taking over the civil market] (6): *IEEE Personal Communications*, February 1995, pages 48 to 53; P. G. Andermo, L. M. Ewerbring: "*A CDMA-Based Radio Access Design for UMTS*"; (7): *ITG Fachberichte [ITG Specialist Reports]* 124 (1993), Berlin, Offenbach: *VDE Verlag ISBN* 3-8007-1965-7, pages 67 to 75; Dr. T. Zimmermann, Siemens AG: "*Anwendung von CDMA in der Mobilkommunikation*" [Use of CDMA in mobile communication](8): *telcom report* 16, (1993), issue 1, pages 38 to 41] Dr. T. Ketseoglou, Siemens AG and Dr. T. Zimmermann, Siemens AG: "*Effizienter Teilnehmerzugriff für die 3. Generation der Mobilkommunikation-Vielfachzugriffsverfahren CDMA macht Luftschnittstelleflexibler*" [Efficient subscriber access for third-generation mobile communication—the CDMA multiple access method makes the air interface more flexible]; (9): *Funkschau* 6/98: R. Sietmann "*Ringen um die UMTS-Schnittstelle*" [Fierce competition for the UMTS interface] pages 76 to 81] WACS or PACS, IS-54, IS-95, PHS, PDC etc. [see IEEE Communications Magazine, January 1995, pages 50 to 57; D. D. Falconer et al: "Time Division Multiple Access Methods for Wireless Personal Communications"]. "Message" is a generic term which covers both the content (information) and the physical representation (signal). Despite a message having the same content that is to say the same information, different signal forms can occur. Thus, for example, a message relating to an item may be transmitted (1) in the form of an image,
(2) as a spoken word,
(3) as a written word, or
(4) as an encrypted word or image.

Transmission types (1) . . . (3) are in this case normally characterized by continuous (analog) signals, while transmission type (4) normally uses discontinuous signals (for example pulses, digital signals).

According to the document Funkschau 6/98: R. Sietmann "Ringen um die UMTS-Schnittstelle" [Fierce competition for the UMTS interface], pages 76 to 81, for example, there are two scenario elements in the UMTS scenario (third-generation mobile radio or IMT-2000). In the first scenario element, the licensed coordinated mobile radio is based on a WCDMA technology (Wideband Code Division Multiple Access) and, as in the case of GSM, is operated using the FDD mode (Frequency Division Duplex), while, in the second scenario element, the unlicensed uncoordinated mobile radio is based on a TD-CDMA technology (Time Division-Code Division Multiple Access) and, like DECT, is operated in the TDD mode (Frequency Division Duplex).

For WCDMA/FDD operation of the Universal Mobile Telecommunications System, the air interface of the telecommunications system, in each case, contains a number of physical channels in the uplink and downlink telecommunications directions, according to the document ETSI STC SMG2 UMTS-L1, Tdoc SMG2 *UMTS-L*1 163/98: *"UTRA Physical Layer Description FDD Parts"* Vers. 0.3, 1998 May 29 of which a first physical channel, the so-called Dedicated Physical Control Channel DPCCH, and a second physical channel, the so-called Dedicated Physical Data Channel DPDCH, are illustrated in FIGS. 1 and 2 related to their time frame structures.

In the downlink direction (radio link from the base station to the mobile station) in the WCDMA/FDD system from ETSI and ARIB, the dedicated physical control channel (DPCCH) and the Dedicated Physical Data Channel (DPDCH) are time-division multiplexed, while I/Q multiplexing is used in the uplink direction, for which the DPDCH is transmitted in the I-channel and the DPCCH in the Q-channel.

The DPCCH contains $N_{pilot}$ pilot bits for channel estimation, $N_{TPC}$ bits for fast power control and $N_{TFI}$ format bits, which indicate the bit rate, the nature of the service, the nature of the error protection coding, etc. (TFI=Traffic Format Indicator).

Based on a GSM radio scenario with, for example, two radio cells and base stations (Base Transceiver Station) arranged in them, with a first base station BTS1 (transmitter/receiver) "illuminating" a first radio cell FZ1 and a second base station BTS2 (transmitter/receiver) "illuminating" a second radio cell FZ2 omnidirectionally, FIG. 3 shows a FDMA/TDMA/CDMA radio scenario, in which the base stations BTS1, BTS2 are connected or can be connected via an air interface, which is designed for the FDMA/TDMA/CDMA radio scenario, to a number of mobile stations MS1 . . . MS5 (transmitter/receiver) located in the radio cells FZ1, FZ2, on appropriate transmission channels TRC via wire-free unidirectional or bidirectional (uplink direction UL and/or downlink direction DL) telecommunication. The base stations BTS1, BTS2 are connected in a known manner (see GSM telecommunication system) to a base station controller BSC (Base Station Controller) which carries out the frequency management and switching functions in the course of controlling the base stations. For its part, the base station controller BSC is connected via a mobile switching center MSC to the higher-level telecommunications network, for example to the PSTN (Public Switched Telecommunication Network. The mobile switching center MSC is the management center for the illustrated telecommunication system. It carries out all call management functions and, using attached registers (not illustrated), authentication of the telecommunications subscribers and position monitoring in the network.

FIG. 4 shows the basic structure of the base station BTS1, BTS2, which are in the form of transmitters/receivers, while FIG. 5 shows the basic structure of the mobile stations MT1 . . . MT5, which are likewise in the form of transmitters/receivers. The base stations BTS1, BTS2 transmit and receive radio messages from and to the mobile stations MTS1 . . . MTS5, while the mobile stations MT1 . . . MT5 transmit and receive radio messages from and to the base stations BTS1, BTS2. To this end, the base stations have a transmitting antenna SAN and a receiving antenna EAN, while the mobile stations MT1 . . . MT5 have a joint antenna ANT for transmission and reception, which can be controlled by an antenna switch AU. In the uplink direction (receiving path), the base stations BTS1, BTS2 receive via the receiving antenna EAN, for example, at least one radio message FN with an FDMA/TDMA/CDMA component from at least one of the mobile stations MT1 . . . MT5, while the mobile stations MT1 . . . MT5 receive in the downlink direction (receiving path), via the common antenna ANT, for example at least one radio message FN with an FDMA/TDMA/CDMA component from at least one base station BTS1, BTS2. The radio message FN in this case includes a broadband-spread carrier signal with information composed of data symbols modulated onto it.

In a radio receiving device FEE (receiver), the received carrier frequency is filtered and is mixed down to an intermediate frequency which, for its part, is then sampled and quantized. After analog/digital conversion, the signal, which has been subject to distortion on the radio path due to multipath propagation, is supplied to an equalizer EQL, which compensates for the majority of the distortion (keyword: synchronization).

A channel estimator KS is then used to attempt to estimate the transmission characteristics of the transmission channel TRC on which the radio message FN has been transmitted. The transmission characteristics of the channel are, in this case, indicated by the channel input response in the time domain. In order to allow the channel impulse response to be estimated, the radio message FN is allocated or assigned at the transmission end (in the present case by the mobile stations MT1 . . . MT5 or the base stations BTS1, BTS2) specific additional information, which is in the form of a training information sequence and is referred to as a midamble.

In a data detector DD following this and which is used jointly for all the received signals, the individual mobile-station-specific signal elements contained in the common signal are equalized and separated in a known manner. After equalization and separation, a symbol-to-data converter SDW is used to convert the data symbols obtained so far to binary data. After this, a demodulator DMOD is used to obtain the original bit stream from the intermediate frequency before, in a demultiplexer DMUX, the individual timeslots are allocated to the correct logical channels, and thus also to the various mobile stations.

The received bit sequence is decoded channel-by-channel in a channel codec KC. Depending on the channel, the bit information is assigned to the monitoring and signaling timeslots or to a voice timeslot and, in the case of the base station (FIG. 4), the monitoring and signaling data and the voice data are passed jointly to an interface SS, which is responsible for the signaling and the voice coding/decoding (voice codec) for transmission to the base station controller (BSC). In the case of the mobile station (FIG. 5)—, the monitoring and signaling data are passed to a control and signaling unit STSE which is responsible for all the signaling and control of the mobile station, and the voice data are passed to a voice codec SPC designed for voice inputting and outputting.

In the voice codec in the interface SS in the base stations BTS1, BTS2, the voice data is in a predetermined data stream (for example, 64 kbps stream in the network direction and 13 kbps stream from the network direction).

All the control for the base stations BTS1, BTS2 is carried out in a control unit STE.

In the downlink direction (transmission path), the base stations BTS1, BTS2 transmit via the transmitting antenna SAN, for example, at least one radio message FN with an FDMA/TDMA/CDMA component to at least one of the mobile stations MT1 . . . MT5, while the mobile stations MT1 . . . MT5 transmit in the uplink direction (transmission path) via the common antenna ANT, for example, at least one radio message FN with an FDMA/TDMA/CDMA component to at least one base station BTS1, BTS2.

In FIG. 4, the transmission path starts in the base stations BTS1, BTS2 in such a way that monitoring and signaling data received in the channel codec KC from the base station controller BSC via the interface SS, together with voice data are assigned to a monitoring and signaling timeslot or to a voice timeslot, and these are coded channel-by-channel into a bit sequence.

In FIG. 5, the transmission path starts in the mobile stations MT1 . . . MT5 in such a manner that voice data received in the channel codec KC from the voice coder SPC and monitoring and signaling data received from the control and signaling unit STSE are assigned to a monitoring and signaling timeslot or to a voice timeslot, and these are coded channel-by-channel into a bit sequence.

The bit sequence obtained in the base stations BTS1, BTS2 and in the mobile stations MT1 . . . MT5 is, in each case, converted in a data-to-symbol converter DSW into data symbols. Following this, the data symbols are spread in a spreading device SPE using a respective subscriber-specific code. In the burst generator BG, including a burst former BZS and a multiplexer MUX, a training information sequence in the form of a midamble for channel estimation is then added to the spread data symbols in the burst former BZS and, in the multiplexer MUX, the burst information obtained in this way is set to the respective correct timeslot. Finally, the burst obtained is, in each case, radio-frequency modulated and is digital/analog converted in a modulator MOD, before the signal obtained in this way is transmitted as a radio message FN via a radio transmission device FSE (transmitter) at the transmitting antenna SAN or the common antenna ANT.

The problem of multiple reception, that is to say of "delay spreads", when echos are present can be solved in CDMA-based systems, despite the wide bandwidth and the very short chip or bit times in these systems, by the received signals being combined with one another in order to increase the detection probability. The channel characteristics must, of course, be known in order to do this. These channel characteristics are determined using a pilot sequence (see: FIGS. 1 and 2) which is common to all subscribers and is additionally transmitted without modulation autonomously via a message sequence and with an increased transmission power. The receiver uses its reception to obtain the information as to how many paths are involved in the present reception situation, and what delay times are occurring in the process.

In a RAKE receiver, the signals arriving via the individual paths are detected in separate receivers, the "fingers" of the RAKE receiver, and are added up, with different weightings to one another, in an addition element after compensation for the delay times and the phase shifts of the echos.

The fingers of the RAKE receiver can be readjusted depending on the change in the transmission channel with the aid of an early and late tracking method (see: J. G. Proakis: "Digital Communications"; McGraw-Hill, Inc; 3rd Edition, 1995; Section 6.3) without having to carry out any further time-consuming and resource-intensive channel estimation. To do this, two additional fingers are, in each case, added to each RAKE finger as shown in FIG. 6. The two fingers detect the received signal r(t) with the same spread code s(t) as the main finger, the only difference to the main finger being that the received signal in the early finger is advanced by one position, and that in the late finger is delayed by one sample position. This method can be used, in particular, in the case of oversampling. The energies collected from the early and late fingers are compared. The finger position of the main finger is shifted in the direction of the stronger finger after this comparison. This is done only when the energy difference exceeds a specific threshold value. The RAKE receiver is described in more detail in the cited literature (see: J. G. Proakis: "Digital Communications"; McGraw-Hill, Inc; 3rd Edition, 1995; Section 14.5).

It can be seen from FIG. 6 that the early finger carries out the despreading process for the received signal one delay unit earlier than the actual main finger. The late finger carries out the despreading process precisely one delay unit later than the main finger.

FIG. 7 shows the formation of a finger. This includes essentially two multipliers MUL and an accumulation unit AE. Each sampled received value r(t) is multiplied by the spread code s(t) and is weighted with the weighting gw in accordance with a channel estimate, this weighting gw being different for each finger in a RAKE receiver.

The values calculated in this way are now added up in accordance with the spread factor. The result for each finger is a complex signal, which represents a despread symbol. In the early and late fingers, multiplication by the weighting can be omitted, that is to say the weighting is unity. All the signals illustrated in FIGS. 6 and 7 are complex, and thus include both a real part and an imaginary part. The results obtained from the early and late fingers are evaluated by forming the magnitude, and subsequent comparison of the magnitude. If the magnitudes differ significantly, that is to say they have a minimum difference, which is defined by a value TH, the position of the fingers is varied such that the main finger is located in the position with the greater energy after the change.

This is illustrated in FIG. 8. The energy which the early finger calculates, in the stage denoted by $P_E$, is compared with the energy $P_L$ calculated by the late finger. This is done simply on the basis of evaluation of the energy difference between the two fingers. In the first case, the fingers are not shifted, since the difference between the early and late energy is not particularly large; i.e., it is significantly less than the threshold value TH to be defined. In the second case, the difference between the early and late fingers is greater than TH, and the energy of the late finger is greater than the energy of the early finger. In consequence, the main finger is shifted by one delay stage to the rear. In the third case, the difference between the early and late fingers is likewise greater than TH and, this time, the energy of the early finger is greater than the energy of the late finger. In consequence, the main finger is shifted by one delay stage forward.

The problem described in the following text can occur when using early and late fingers in the rake receivers:

If, as shown in FIG. 9, the received data is buffer-stored in an RAM memory SP, in order then to be passed on by appropriate memory accesses via a multiplexer MUX to the RAKE receiver, then three memory accesses must be carried out per RAKE finger. One access is, in each case, required for the main, the early and the late finger. If, for example, the data is written to the memory using a 4 MHz sampling frequency, then that memory must be readable at 96 MHz if there are eight RAKE fingers. This ratio changes in the case of oversampling since, then, the data is written to the memory at a higher speed, corresponding to the oversampling rate.

FIG. 9 shows a conventional circuit. The three RAKE fingers access the RAM memory SP independently of one another via the multiplexer MUX. The scrambling is reversed (descrambling), and path weighting is carried out in a known manner via a number of multipliers MUL in the RAKE receiver.

An object on which the present invention is based is to specify a method for memory access control in RAKE receivers with early-late tracking in telecommunications systems with wire-free telecommunication between mobile and/or stationary transmitters/receivers, in particular in third-generation mobile radio systems, in which the number of memory accesses is less than with the previously known methods.

SUMMARY OF THE INVENTION

Accordingly, the present invention is directed to a method wherein data which is received in the RAKE receiver and is read by a late finger in the early-late tracking is buffer-stored and is passed on one read cycle later to an early finger for reading by the same in the early-late tracking.

An idea on which the present invention is based is to make use of a characteristic which results from the ratio of the early and late data to one another. The data which is read by a late finger is read one read cycle later by the corresponding late finger. It is thus sufficient to buffer-store data read by the late finger in a memory and to pass such data on appropriately to the early finger which then need no longer itself directly access the memory. If no oversampling is used, then it is even possible to replace all three memory accesses by just one. If the early and the late finger share one memory access, the total number of memory accesses is reduced by ⅓. The use of slower and, thus, more cost-effective memory modules is hence possible.

Additional features and advantages of the present invention are described in, and will be apparent from, the Detailed Description of the Preferred Embodiments and the Drawings.

DETAILED DESCRIPTION OF THE PREFERRED EMBODIMENTS

Figure 1:
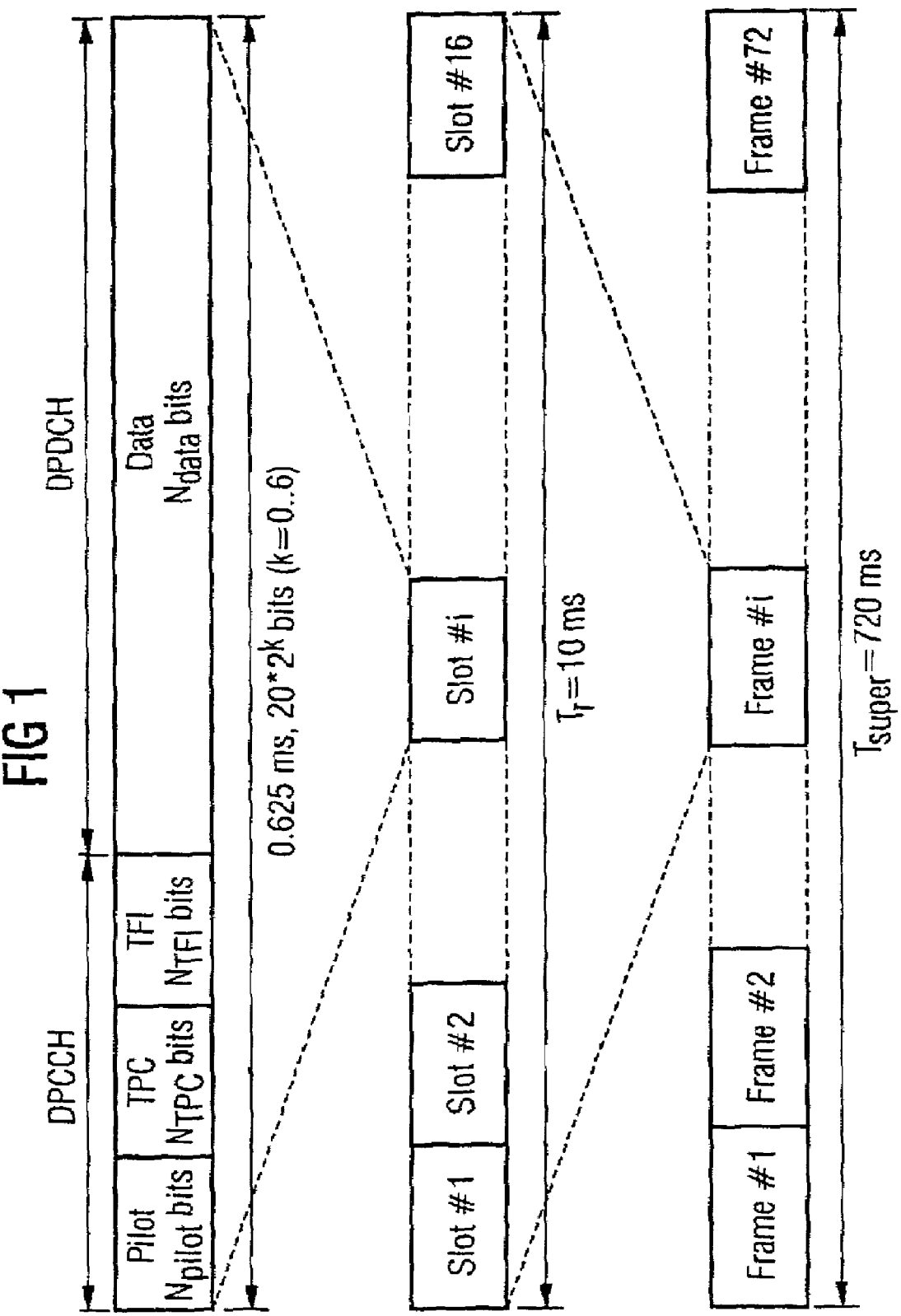
FIGS. 1 and 2 show, for the WCDMA/FDD operation of the universal mobile telecommunication system, the Dedicated Physical Control Channel and the Dedicated Physical Data Channel of the air interface of a telecommunication system with respect to their framed structures.
Figure 2:
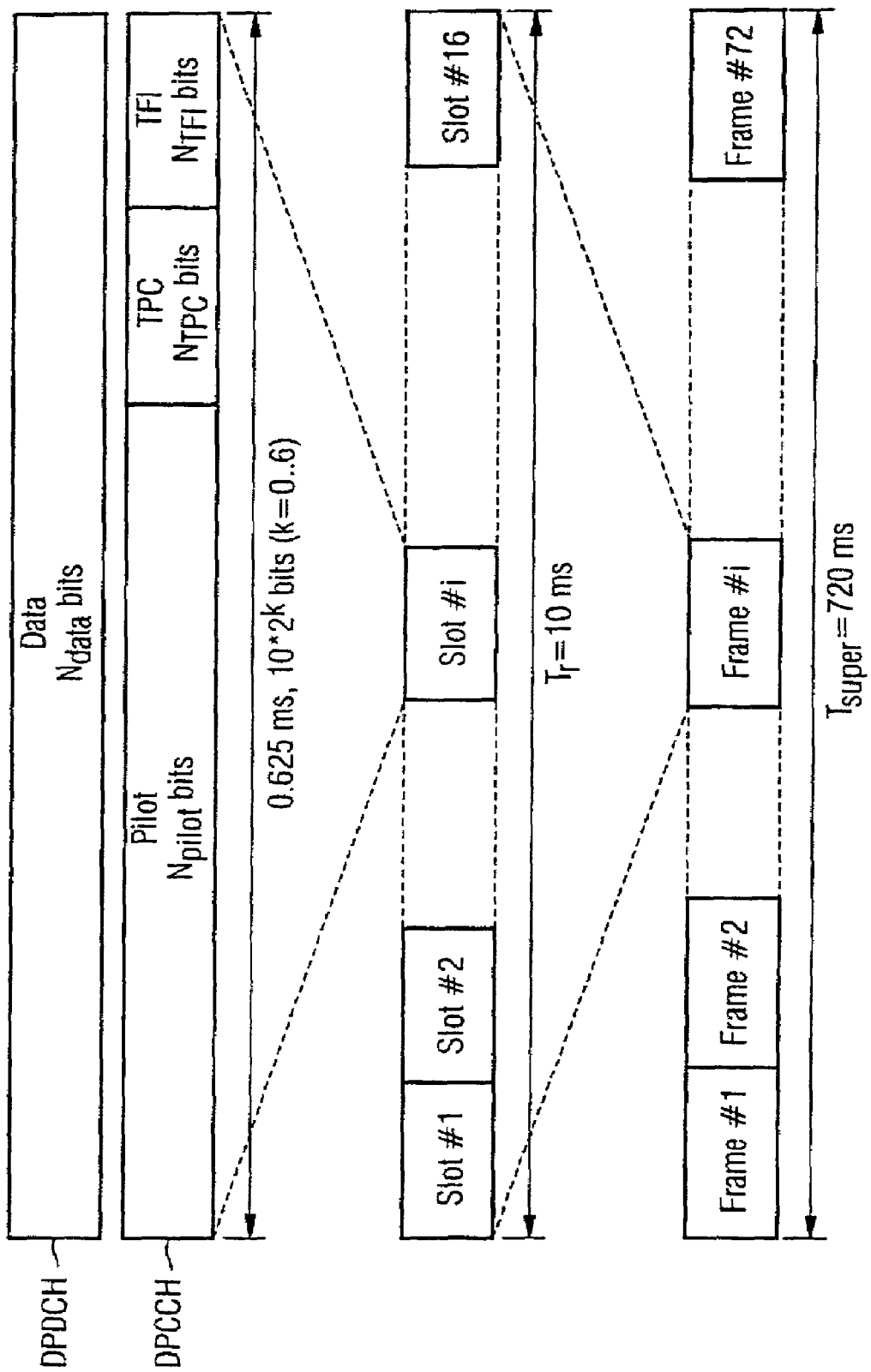
Figure 3:
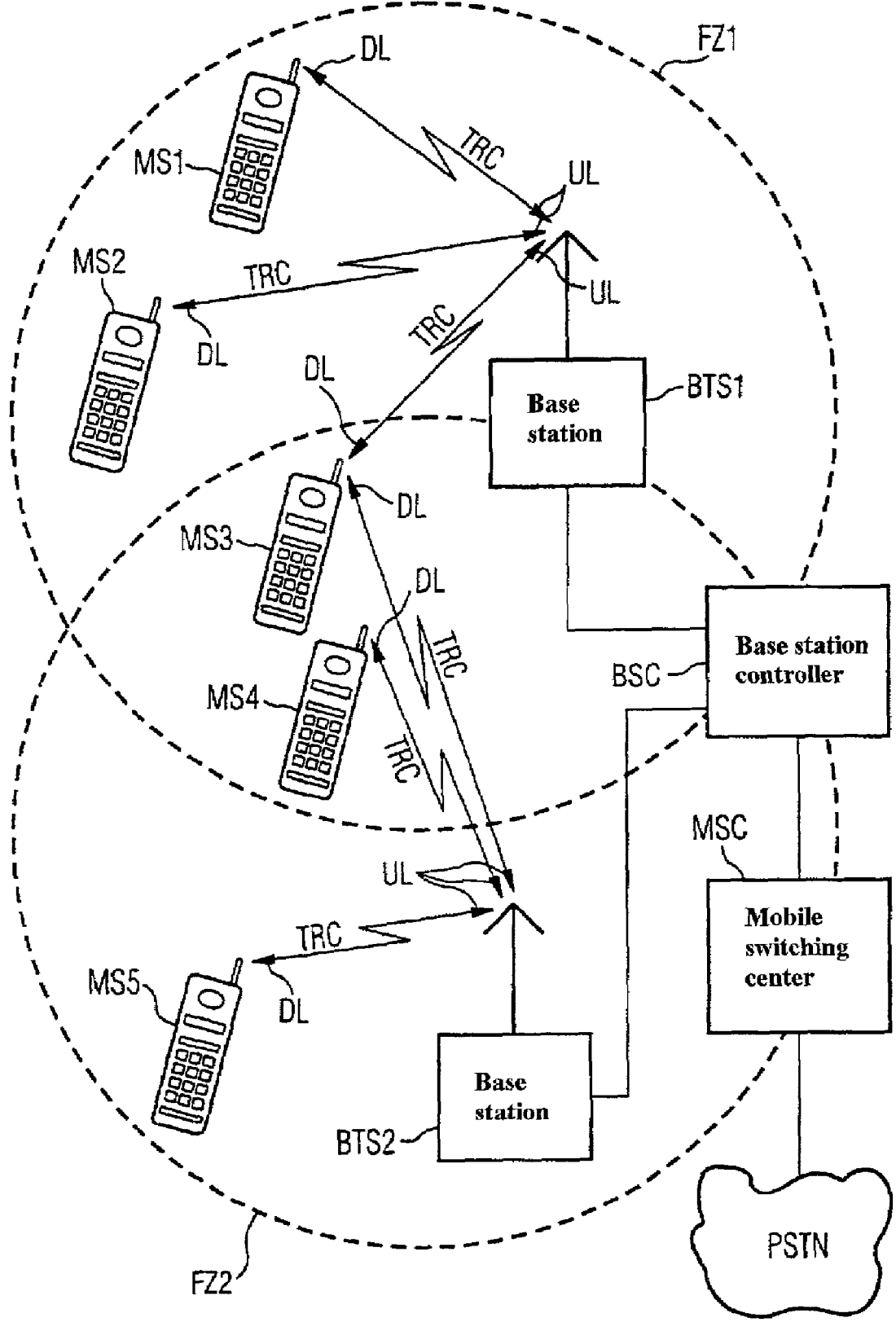
FIG. 3 shows, on the basis of the GSM radio scenario, first and second base transceiver stations.
Figure 4:
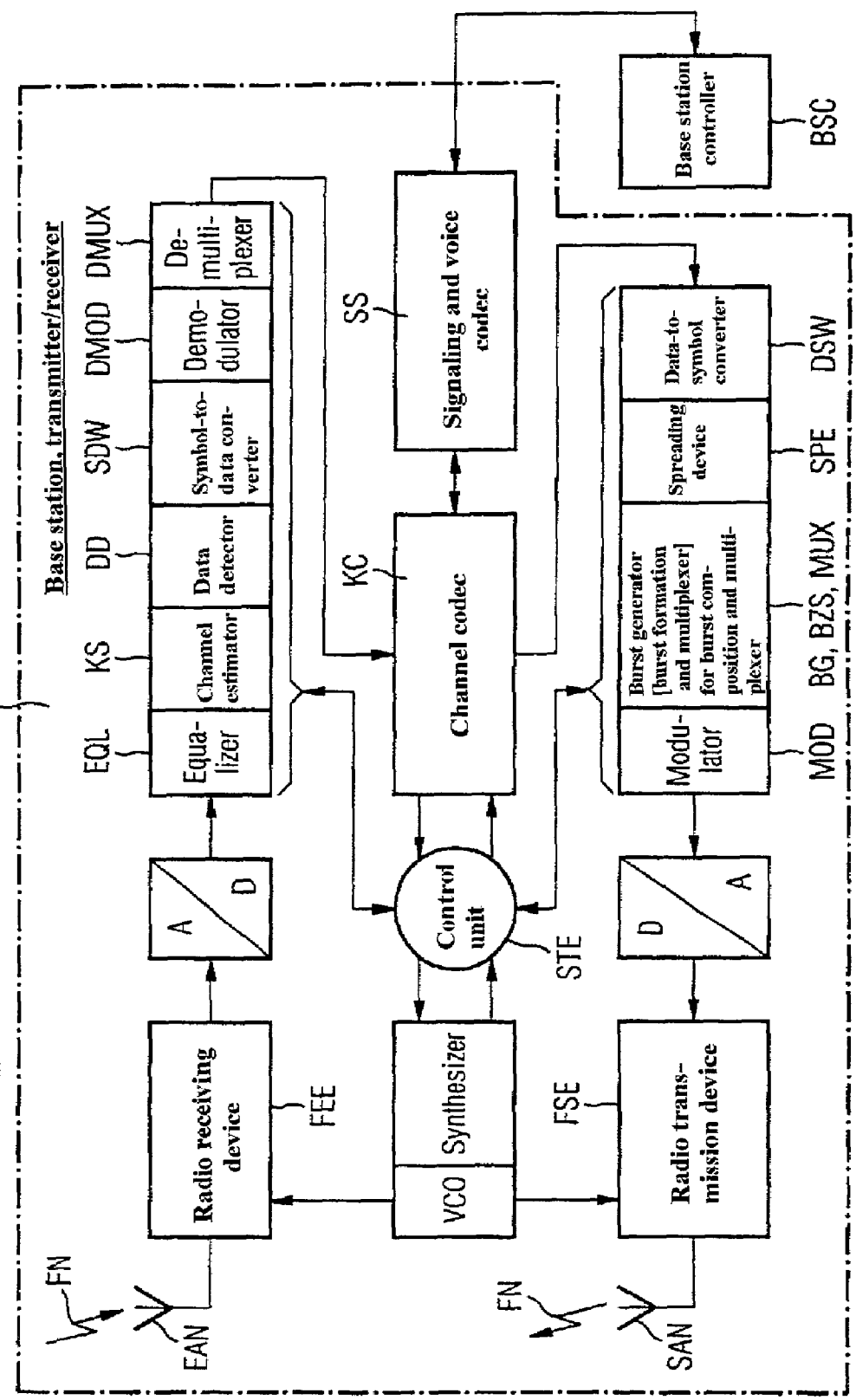
FIG. 4 shows the basic configuration of the base transceiver station constructed as a transceiver.
Figure 5:
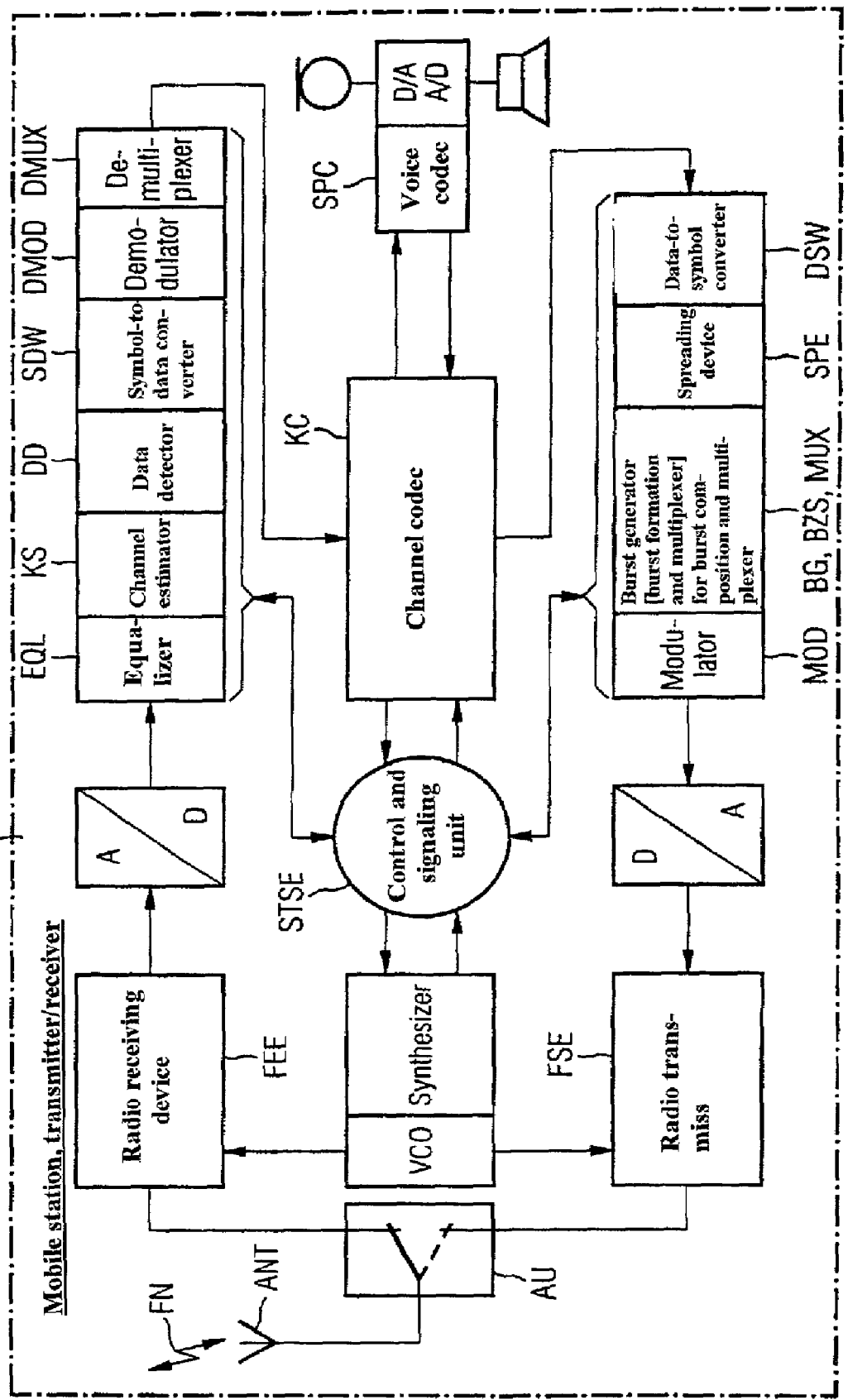
FIG. 5 shows the basic configuration of the mobile station constructed as a transceiver.
Figure 6:
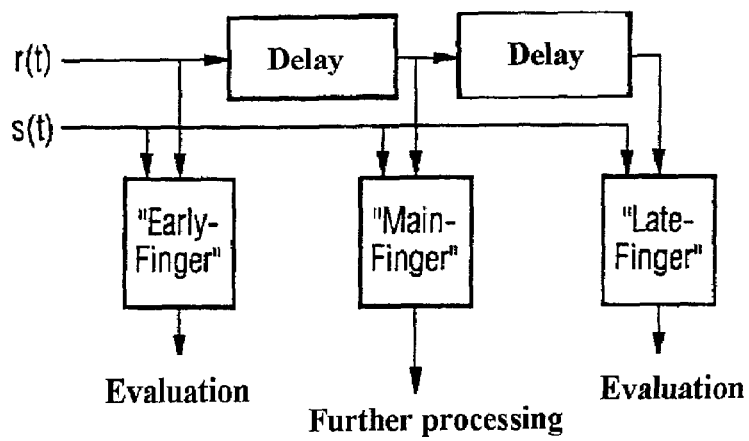
FIG. 6 shows the fingers of the RAKE receiver being readjusted wherein two additional fingers are added to each RAKE finger.
Figure 7:
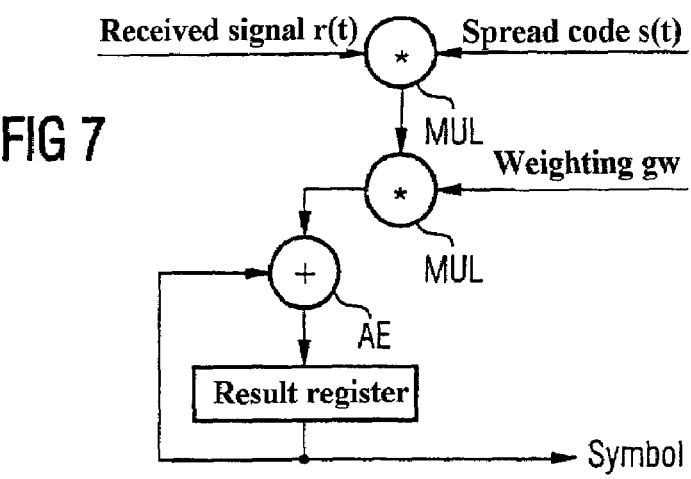
FIG. 7 shows the formation of a finger including two multipliers and an accumulation unit.
Figure 8:
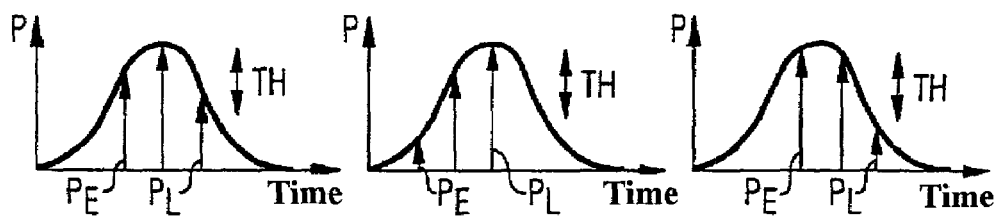
FIG. 8 illustrates the evaluation of the energy difference between the early and late fingers.
Figure 9:
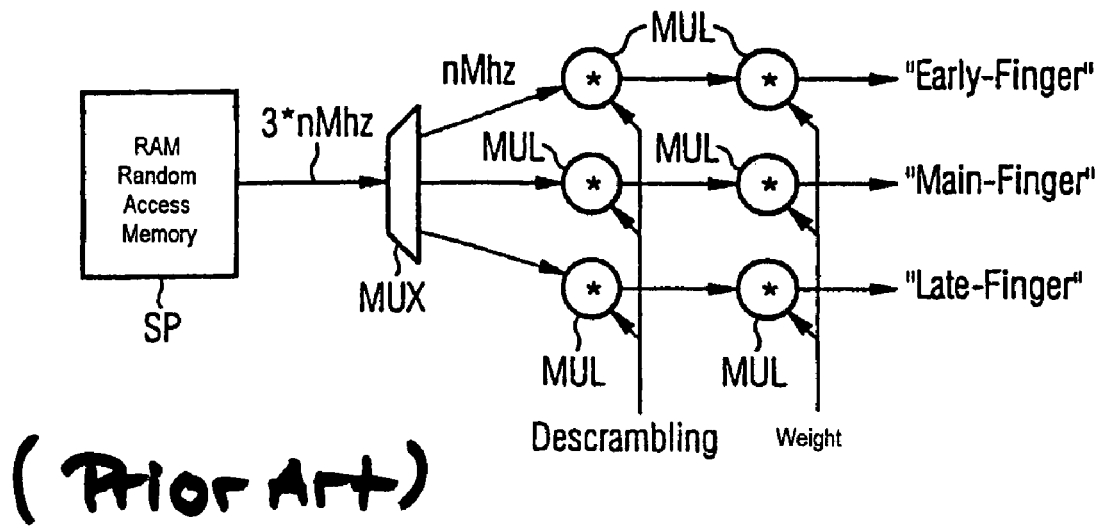
FIG. 9 shows a conventional circuit wherein three RAKE fingers access the RAM memory independently of one another via a multiplexor.
Figure 10:
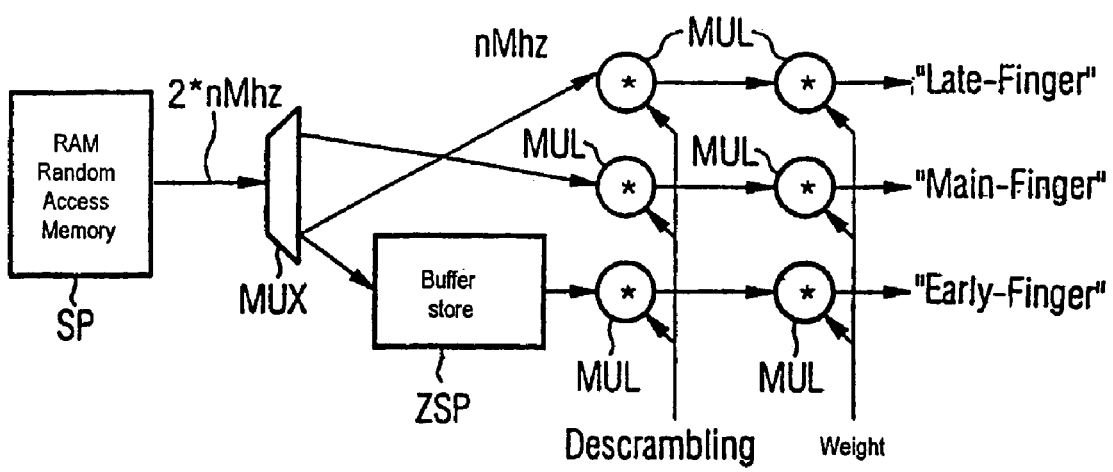
FIG. 10 shows a modified version of the circuit shown in FIG. 9 wherein one memory access can be saved in the case of memory accesses in a RAKE receiver.

Based on FIG. 9, FIG. 10 shows how one memory access can be saved in the case of memory accesses in a RAKE receiver.

FIG. 10 shows a circuit modified from that in FIG. 9. Two of the three RAKE fingers, the main finger and the late finger, once again access the RAM memory SP via the multiplexer MUX independently of one another. Once again, the scrambling is reversed (descrambling) and a path weighting is carried out in a known manner using a number of multipliers MUL in the RAKE receiver. In the case of access by the late finger for the early-late tracking, the data read from the RAM memory SP is buffer-stored in a buffer store (register) ZSP, and is passed on one read cycle later to the early finger for reading by the same in the early-late tracking.

To assist understanding of the memory access process shown in FIG. 10, this process will be described for the following access scenario, which relates to one finger. In the example, the oversampling rate is chosen to have a value "2", that is to say two samples per chip are stored in the memory SP.

The received signal is stored in the RAM memory SP at a sampling rate $T_c/2$, $T_c$ is the time duration of a chip.

The read address is calculated from the path delay. Only data in the $T_c$ frame are required for despreading the signal.

EXAMPLE

Delay=$7*T_c$, refers to the signal being delayed by 7 chips, and the first correct value is that in the 7th chip position.

Since two samples are stored per chip, the first sample must be read at the address "14(14/2=7)".

The received signal is read starting from the address "14". The address counter then counts onwards in steps of 2. Addresses "14, 16, 18, 20, 22, 24 etc." are thus read. This applies to the main finger.

The late and early fingers require the signal delayed by half a chip and the signal that arrived half a chip earlier, respectively.

Thus, the addresses "13, 15, 17, 19, 21 etc." are read for the early finger, while the addresses "15, 17, 19, 21, 23 etc." are read for the late finger.

This can be done quite easily since the values in the $T_c/2$ frame are stored in the RAM memory SP so that the early address can be calculated from the main address minus 1, and the late address can be calculated from the main address plus 1.

The addresses "13, 14 and 15" therefore need to be read from the memory SP in the first step. The addresses "15, 16 and 17" are read in the second step, etc.

If the procedure used in the circuit shown in FIG. 9 is used, then 3 memory accesses are required per calculation step; resulting in an access speed of 12 MHz for a 4 MHz signal. If the memory is now read simultaneously by 8 fingers, that is to say 8 early fingers, 8 late fingers and 8 main fingers, then access is required at 12*8 MHz=96 MHz.

However, with this configuration, the memory location "15" is read in the second step, although it has already been used in the first step. One memory access per processing step is thus sufficient for the early and late fingers. The value for the early finger is obtained by delaying the value for the late finger by one chip. Thus, if the late finger reads the value "17", the output of the delay element for the early finger is first fed with the value "15". However, this results in the correct sequence for the various fingers.

The number of memory accesses can, thus, be reduced by ⅓ since the early and late fingers share one memory access. Slower and more cost-effective memory modules can then be used which, in turn, results in reduced power consumption.

Although the present invention has been described with reference to specific embodiments, those of skill in the art will recognize that changes may be made thereto without departing from the spirit and scope of the invention as set forth in the hereafter appended claims.

What is claimed is:

1. A method for memory access control in RAKE receivers with early-late tracking in telecommunications systems with wire-free telecommunication between at least one mobile and stationary transceivers, in third-generation mobile radio systems, the method comprising the steps of:
   receiving data in the RAKE receiver;
   reading the data by an late finger in the early-late tracking;
   buffer-storing the data; and
   passing on the data one read cycle later to a early finger for reading by the late finger in the early-late tracking.

* * * * *